United States Patent
Morishima

(10) Patent No.: US 8,686,740 B2
(45) Date of Patent: Apr. 1, 2014

(54) CALIBRATION METHOD FOR INERTIAL DRIVE ACTUATOR, AND INERTIAL DRIVE ACTUATOR DEVICE

(75) Inventor: Tetsuya Morishima, Hachioiji (JP)

(73) Assignee: Olympus Corporation, Tokyo (JP)

( * ) Notice: Subject to any disclaimer, the term of this patent is extended or adjusted under 35 U.S.C. 154(b) by 574 days.

(21) Appl. No.: 12/892,198

(22) Filed: Sep. 28, 2010

(65) Prior Publication Data
US 2011/0080178 A1 Apr. 7, 2011

(30) Foreign Application Priority Data
Oct. 5, 2009 (JP) ................................. 2009-231474

(51) Int. Cl.
*G01R 35/00* (2006.01)
*G01R 27/26* (2006.01)

(52) U.S. Cl.
USPC ............................ 324/601; 324/658; 324/686

(58) Field of Classification Search
USPC ........................... 324/457, 458, 601, 658–690
See application file for complete search history.

(56) References Cited

U.S. PATENT DOCUMENTS

| | | | | |
|---|---|---|---|---|
| 6,296,093 | B1 * | 10/2001 | Norris et al. .................. | 188/378 |
| 7,063,192 | B2 * | 6/2006 | Mayama ........................ | 188/378 |
| 7,301,257 | B2 * | 11/2007 | Hwang et al. .................. | 310/317 |
| 8,207,746 | B2 * | 6/2012 | Morishima .................... | 324/622 |
| 8,290,731 | B2 * | 10/2012 | Morishima .................... | 702/88 |
| 2002/0143484 | A1 * | 10/2002 | Chiesa .......................... | 702/94 |
| 2004/0201443 | A1 * | 10/2004 | Kaneko ........................ | 337/100 |
| 2006/0108523 | A1 * | 5/2006 | Ue ................................ | 250/309 |
| 2007/0159507 | A1 * | 7/2007 | Urano ............................ | 347/20 |
| 2007/0199377 | A1 * | 8/2007 | Katsumata et al. ......... | 73/514.32 |
| 2008/0164783 | A1 * | 7/2008 | Okada ....................... | 310/323.16 |
| 2008/0278840 | A1 * | 11/2008 | Matsuki ......................... | 360/71 |
| 2010/0032255 | A1 * | 2/2010 | Conti et al. ................... | 188/272 |
| 2010/0149721 | A1 * | 6/2010 | Prandi .......................... | 361/277 |
| 2010/0207217 | A1 * | 8/2010 | Zuniga-Ortiz et al. ....... | 257/415 |

FOREIGN PATENT DOCUMENTS

| | | |
|---|---|---|
| JP | 64-059010 A | 3/1989 |
| JP | 2003-185406 | 7/2003 |
| JP | 2003185406 A * | 7/2003 |
| JP | 2005-077280 A | 3/2005 |
| JP | 2009-189132 A | 8/2009 |

OTHER PUBLICATIONS

Japanese Office Action dated Apr. 3, 2013 in Japanese Patent Application No. 2009-231474.

* cited by examiner

*Primary Examiner* — Huy Q Phan
*Assistant Examiner* — Adam Clarke
(74) *Attorney, Agent, or Firm* — Scully, Scott, Murphy & Presser, P.C.

(57) ABSTRACT

A calibration method for an inertial drive actuator of detecting a position of a moving body based on an electrostatic capacitance is proposed. The calibration method includes driving the moving body; outputting a first signal for detecting the electrostatic capacitance of opposing parts of a moving body side electrode provided on the moving body and a detecting electrode provided opposing the moving body side electrode; receiving a second signal obtained after the first signal output at the outputting has passed through the moving body side electrode and the detecting electrode; and calculating an optimum first signal based on the second signal received at the receiving.

18 Claims, 17 Drawing Sheets

100

200

300

CALIBRATION METHOD FOR INERTIAL DRIVE ACTUATOR, AND INERTIAL DRIVE ACTUATOR DEVICE

CROSS-REFERENCE TO RELATED APPLICATION

The present application is based upon and claims the benefit of priority from the prior Japanese Patent Application No. 2009-231474 filed on Oct. 5, 2009; the entire contents of which are incorporated herein by reference.

BACKGROUND OF THE INVENTION

1. Field of the Invention

The present invention relates to a calibration method for inertial drive actuator, an inertial drive actuator device, and a method of calculating a position of a moving body.

2. Description of the Related Art

FIG. 16 is a side-view depicting the structure of a conventional actuator 920. As shown in FIG. 16, the actuator 920 includes a piezoelectric element 911, which is a type of electromechanical converting element, a drive shaft 912, a moving body 913 that is friction-coupled to the drive shaft 912, and a frame 914 of the actuator 920. One end of the piezoelectric element 911 is fixed to the frame 914 while the other end of the piezoelectric element 911 is fixed to the drive shaft 912.

A detecting member 921 that is fixed to the frame 914 constitutes a fixed electrode for detecting a position of the moving body 913 based on an electrostatic capacitance. The detecting member 921 is disposed parallel to a direction of movement of the moving body 913 in a contactless manner. The drive shaft 912, the moving body 913, and the detecting member (fixed electrode) 921 are made of a conductive material. The surface of the detecting member 921 that opposes the moving body 913 constitutes a detecting member 921. The detecting member 921 and the moving body 913 are arranged with a gap D therebetween and they constitute a capacitor having an electrostatic capacitance C.

FIG. 17 is a plan-view depicting the structure of the detecting member 921 and the relationship between the detecting member 921 and the moving body 913. As shown in FIG. 17, the detecting member 921 includes a first electrode 921a and a second electrode 921b arranged on an insulation member 921p. Each of the first electrode 921a and the second electrode 921b has a shape of a right-angled triangle. The first electrode 921a and the second electrode 921b are arranged in such a way that their oblique sides are adjacent to each other. A driving signal output from a driving circuit 918 (see FIG. 16) is applied to the piezoelectric element 911 and also to the moving body 913 via the drive shaft 912.

As in an exemplary state shown in FIG. 17, the moving body 913 and the first electrode 921a face each other and are coupled by electrostatic-capacitive coupling. Similarly, the moving body 913 and the second electrode 921b face each other and they are coupled by an electrostatic-capacitive coupling. As a result, the driving signal applied to the moving body 913 flows toward the first electrode 921a and the second electrode 921b. A current i flowing toward the first electrode 921a and the second electrode 921b is detected by a detecting circuit 919 the value of the current i is input into a control circuit 917.

As an example, a case is explained here in which the moving body 913 moves in the direction of an arrow a (see FIG. 17) from the first electrode 921a toward the second electrode 921b. Because of the movement of the moving body 913, while on one hand an opposing electrode surface area between the moving body 913 and the first electrode 921a decreases gradually leading to a gradual decrease in an electrostatic capacitance Ca between the two, on the other hand an opposing electrode surface area between the moving body 913 and the second electrode 921b increases gradually leading to a gradual increase in an electrostatic capacitance Cb between the two. Consequently, as the moving body 913 moves, a current is flowing from the moving body 913 to the first electrode 921a decreases gradually, and a current ib flowing from the moving body 913 to the second electrode 921b increases gradually.

On the other hand, when the moving body 913 moves in the opposite direction of the arrow a, from the second electrode 921b toward the first electrode 921a, while on one hand the opposing electrode surface area between the moving body 913 and the first electrode 921a increases gradually leading to a gradual increase in the electrostatic capacitance Ca between the two, on the other hand the opposing electrode surface area between the moving body 913 and the second electrode 921b decreases gradually leading to a gradual decrease in the electrostatic capacitance Cb between the two. Consequently, as the moving body 913 moves, the current ia flowing from the moving body 913 to the first electrode 921a increases gradually, and the current ib flowing from the moving body 913 to the second electrode 921b decreases gradually.

Thus, the position of the moving body 913 in relation to the detecting member 921 can be determined by comparing the amounts of the currents ia and ib that increase and decrease with the movement of the moving body 913. In addition, the direction of movement of the moving body 913 can be determined based on whether the currents ia and ib increase or decrease.

Such an actuator is disclosed, for example, in Japanese Patent Application Laid-open No. 2003-185406.

However, with use, due to factors such as humidity, temperature, gravity, and aging, the electrostatic capacitance of the actuator 920 tends to differ from the initial value of the actuator 920 detected at the time of its assembly. The electrostatic capacitance between the moving body 913 and the detecting member 921 is being measured in this case. When the electrostatic capacitance is large, an electric resistance decreases, leading to an increase of a voltage and a current of a received detection signal. This may cause an error, a false decision, or a malfunctioning in an A/D converter. Conversely, when the electrostatic capacitance is small, the electric resistance increases, leading to a decrease of the voltage and the current of the received signal. In this situation, because the A/D converter cannot be efficiently used, a position detection precision may degrade.

SUMMARY OF THE INVENTION

The present invention has been made in view of the above discussion and has an object to provide a calibration method for an inertial drive actuator and an inertial drive actuator device that can perform position detection with high precision, regardless of an amount of an electrostatic capacitance.

To solve the above problems and to achieve the above objects, a calibration method for an inertial drive actuator of detecting a position of a moving body based on an electrostatic capacitance according to an aspect of the present invention includes driving the moving body; outputting a first signal for detecting the electrostatic capacitance of opposing parts of a moving body side electrode provided on the moving body and a detecting electrode provided opposing the moving body side electrode; receiving a second signal obtained after the first signal output at the outputting has passed through the moving body side electrode and the detecting electrode; and calculating an optimum first signal based on the second signal received at the receiving.

A calibration method for the inertial drive actuator according to another aspect of the present invention preferably further includes confirming, after the optimum first signal is calculated at the calculating, whether the optimum first signal is optimal.

In a calibration method for the inertial drive actuator according to still another aspect of the present invention, it is preferable that the confirming includes determining whether the second signal is equal to an optimum second signal corresponding to the optimum first signal.

A calibration method for the inertial drive actuator according to another aspect of the present invention preferably further includes subjecting the optimum first signal calculated at the calculating to a correction calculation if it is determined at the determining that the second signal is not equal to the optimum second signal.

In a calibration method for the inertial drive actuator according to still another aspect of the present invention, it is preferable that the outputting includes outputting different signals when outputting the first signal to the moving body twice or more at the same place.

In a calibration method for the inertial drive actuator according to still another aspect of the present invention, it is preferable that the moving body is movable between one movement limit position and the other movement limit position, and the calculating includes calculating the optimum first signal at each of the one movement limit position and the other movement limit position.

In a calibration method for the inertial drive actuator according to still another aspect of the present invention, it is preferable that the outputting includes staring output of the first signal with a signal that is within an allowable range for A/D conversion.

In a calibration method for the inertial drive actuator according to still another aspect of the present invention, it is preferable that the electrostatic capacitance is proportionally related to a distance from the one movement limit position to the other movement limit position.

In a calibration method for the inertial drive actuator according to still another aspect of the present invention, it is preferable that when there is a plurality of the moving bodies, there is a separate optimum first signal for each moving body.

In a calibration method for the inertial drive actuator according to still another aspect of the present invention, it is preferable that, when there is a plurality of the moving bodies, the optimum first signals of the moving bodies are unified.

A calibration method for the inertial drive actuator according to another aspect of the present invention preferably further includes comparing the optimum first signals to determine which one is optimal when the optimum first signals at the one movement limit position and the other movement limit position differ from each other.

An inertial drive actuator device according to still another aspect of the present invention includes a driving unit that drives a moving body; an output unit that outputs a first signal for detecting an electrostatic capacitance of opposing parts of a moving body side electrode provided on the moving body and a detecting electrode provided opposing the moving body side electrode; a receiving unit that receives a second signal obtained after the first signal output by the output unit has passed through the moving body side electrode and the detecting electrode; and a calculating unit that calculates an optimum first signal based on the second signal received by the receiving unit.

In an inertial drive actuator device according to still another aspect of the present invention, it is preferable that the moving body moves by inertia in relation to an oscillating plate that is moved to reciprocate, and the detecting electrode is disposed between the moving body and the oscillating plate.

In an inertial drive actuator device according to still another aspect of the present invention, it is preferable that the detecting electrode also functions as a driving electrode that produces electrostatic attraction between itself and the moving body side electrode and controls frictional forces between the oscillating plate and the moving body.

In an inertial drive actuator device according to still another aspect of the present invention, it is preferable that a plurality of the detecting electrodes is provided.

In an inertial drive actuator device according to still another aspect of the present invention, it is preferable that a plurality of the moving bodies is provided.

In an inertial drive actuator device according to still another aspect of the present invention, it is preferable that the moving body is made of a conductive material.

An inertial drive actuator device according to still another aspect of the present invention preferably further includes a permanent magnet disposed on a side of the oscillating plate opposite to the moving body, wherein the moving body includes a magnetic material.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Exemplary embodiments of a calibration method for an inertial drive actuator and an inertial drive actuator device according to the present invention are explained in detail below with reference to the accompanying drawings. However, the invention is not limited to the embodiments explained below.

First Embodiment

Figure 1:
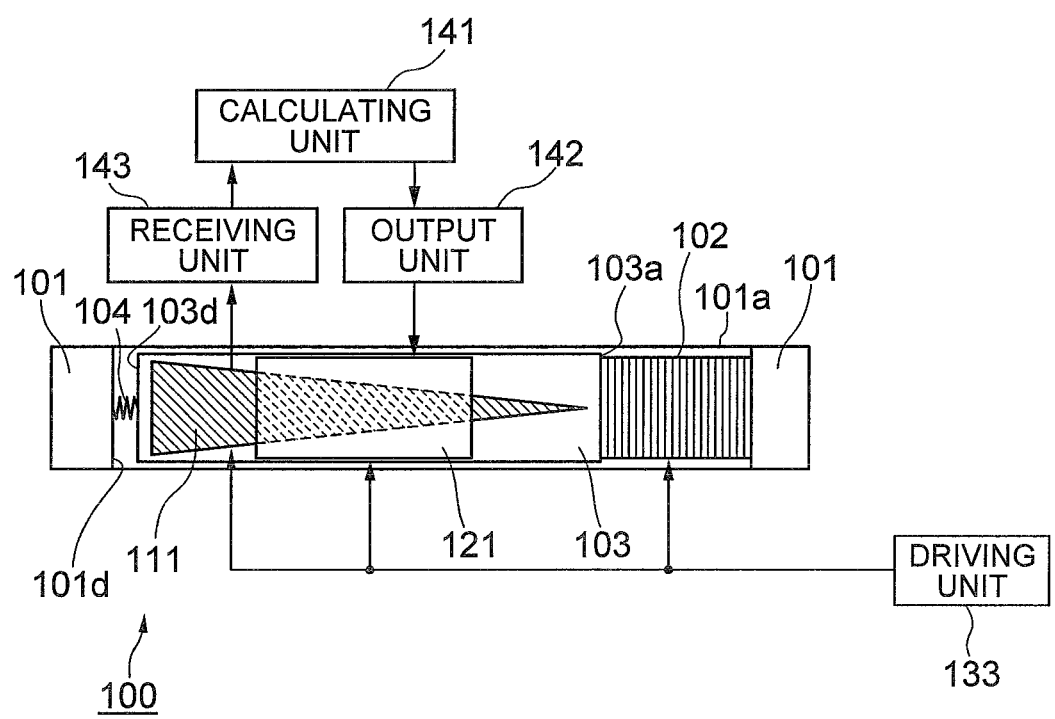
FIG. 1 is a plan view depicting a structure of an inertial drive actuator device according to a first embodiment of the present invention.
Figure 2:
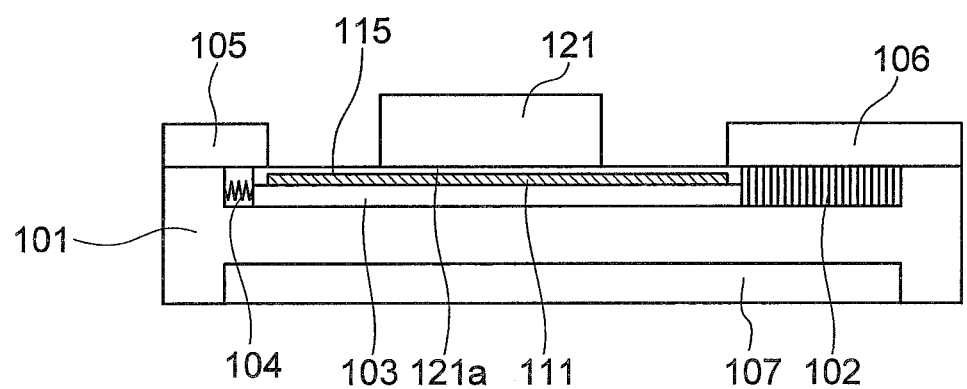
FIG. 2 is a side view depicting a structure of an inertial drive actuator according to the first embodiment of the present invention.

A structure of an inertial drive actuator device according to a first embodiment is explained with reference to FIGS. 1 and 2. FIG. 1 is a plan view depicting the structure of the inertial drive actuator device according to the first embodiment of the present invention. FIG. 2 is a side view depicting a structure of an inertial drive actuator 100 of the inertial drive actuator device. In FIG. 1, projecting sections 105 and 106 that are shown in FIG. 2 are not shown.

The inertial drive actuator device according to the first embodiment includes the inertial drive actuator 100, and a driving unit 133, a calculating unit 141, an output unit 142, and a receiving unit 143 that are connected to the inertial drive actuator 100.

The inertial drive actuator 100 includes a fixed member 101, a piezoelectric element 102, an oscillating plate 103 displaceably mounted on the fixed member 101, a spring 104, the projecting sections 105 and 106 formed on the fixed member 101, a detecting electrode 111 (oscillating plate electrode) disposed on the oscillating plate 103, and a moving body 121. A permanent magnet 107 is disposed below the fixed member 101.

One end of the piezoelectric element 102 is disposed adjacent to an inner surface 101a of the fixed member 101. The other end of the piezoelectric element 102 is disposed adjacent to a right hand side surface 103a of the oscillating plate 103.

The spring 104 is disposed so as to face the piezoelectric element 102 via the oscillating plate 103. In other words, one end of the spring 104 is disposed adjacent to an inner surface 101d of the fixed member 101 while the other end is disposed adjacent to a left hand side surface 103d of the oscillating plate 103.

In the inertial drive actuator 100, when the piezoelectric element 102 expands and because of which the oscillating plate 103 is displaced, the spring 104 supports the oscillating plate 103. On the contrary, when the piezoelectric element 102 contracts, the elastic force of the spring 104 causes the oscillating plate 103 to revert to its original position. In other words, the spring 104 assists to convey the expansion and contraction of the piezoelectric element 102 to the oscillating plate 103. A structure is allowable in which both the ends of the piezoelectric element 102 and both the ends of the spring 104 are fixed to any one of the fixed member 101 and the oscillating plate 103 or both.

The detecting electrode 111 is formed on an upper surface of the oscillating plate 103. Moreover, an insulation layer 115 is formed on an upper surface of the detecting electrode 111. The moving body 121 is mounted on the detecting electrode 111, with the insulation layer 115 disposed therebetween. A moving body side electrode 121a is formed on a lower surface of the moving body 121, that is, on a surface that is in contact with the detecting electrode 111.

The detecting electrode 111 has a planar shape of a triangle that narrows from the side of the spring 104 to the side of the piezoelectric element 102 along a longitudinal direction of the oscillating plate 103. Because of the change in a width of the detecting electrode 111 in the longitudinal direction of the oscillating plate 103, as the moving body 121 moves from one movement limit position (a position where the moving body 121 abuts against the projecting section 105) to the other movement limit position (a position where the moving body 121 abuts against the projecting section 106), the electrostatic capacitance between the moving body side electrode 121a of the moving body 121 and the detecting electrode 111 varies. Furthermore, because a planar shape of the detecting electrode 111 is made into a triangular shape, there is a proportional relationship between a position of the moving body 121 and the electrostatic capacitance in a movement range from the one movement limit position to the other movement limit position.

With the displacement of the oscillating plate 103, the moving body 121 is capable of moving slidingly in relation to the insulation layer 115 in a longitudinal direction (right and left directions in FIGS. 1 and 2) of the oscillating plate 103 having a rectangular shape. The moving body 121 should preferably be made of a magnetic material or an electrically conductive material.

The projecting section 105 is formed on the upper surface at the end of the fixed member 101 on the side of the spring 104 in such a way that it covers from above the spring 104 and the end of the insulation layer 115 on the side of the spring 104. The projecting section 106 is formed on the upper surface at the end of the fixed member 101 on the side of the piezoelectric element 102 in such a way that it covers from above the piezoelectric element 102 and the end of the insulation layer 115 on the side of the piezoelectric element 102.

The projecting sections 105 and 106 limit the movement range of the moving body 121. In other words, a position where the moving body 121 abuts against the projecting section 105 marks one movement limit position of the moving body 121, and a position where the moving body 121 abuts against the projecting section 106 marks other movement limit position of the moving body 121. A distance between the one movement limit position and the other movement limit position is the maximum distance for which the moving body 121 can move (movement limit distance).

The driving unit 133 is connected to each of the piezoelectric element 102, the detecting electrode 111, and the moving body side electrode 121a of the moving body 121. The driving unit 133 applies a driving voltage to drive each of the piezoelectric element 102, the detecting electrode 111, and the moving body side electrode 121a of the moving body 121.

It is preferable that the inertial drive actuator device according to the first embodiment be provided with an electrostatic capacitance detecting circuit that is connected to the detecting electrode 111 and that detects the electrostatic capacitance between the moving body side electrode 121a of the moving body 121 and the detecting electrode 111, and a control circuit that receives signals output from the electrostatic capacitance detecting circuit. A detailed explanation thereof has been omitted. The control circuit generates a drive signal based on the signals output from the electrostatic capacitance detecting circuit, and outputs the drive signal to the driving unit 133.

The output unit 142 is connected to the moving body side electrode 121a, and the receiving unit 143 is connected to the detecting electrode 111. The output unit 142 and the receiving unit 143 are connected to the calculating unit 141.

The output unit 142 outputs a first signal that detects the electrostatic capacitance of opposing parts of the moving body side electrode 121a provided in the moving body 121 and the detecting electrode 111 provided opposing the moving body side electrode 121a.

The receiving unit 143 receives a second signal, which is obtained when the first signal output from the output unit 142 to the moving body side electrode 121a has passed through the moving body side electrode 121a and the detecting electrode 111. The receiving unit 143 converts the second signal to a digital signal with an internal A/D converter, and outputs the digital second signal to the calculating unit 141.

The calculating unit 141 calculates an optimum first signal and an optimum second signal based on the digital second signal received from the receiving unit 143. The output unit 142 outputs the calculated optimum first signal to the moving body side electrode 121a. The receiving unit 143 receives the second signal that is obtained when the optimum first signal has passed through the moving body side electrode 121a and the detecting electrode 111. The calculating unit 141 determines whether the second signal and the optimum second signal are equal, and based on the result of the determination, confirms whether the optimum first signal is optimal. If it is determined that the second signal and the optimum second signal are not equal, the calculating unit 141 performs a correction calculation on the optimum first signal so that the second signal obtained based on the output of the optimum first signal, and the optimum second signal become equal. The calculating unit 141 calculates the optimum first signal when the moving body 121 is at the one movement limit position or the other movement limit position.

A detection method for detecting the position of the moving body 121 is explained next.

The position of the moving body 121 is detected by using the same components that are used for driving the inertial drive actuator 100. That is, the position of the moving body 121 is detected by using the moving body side electrode 121a provided on the moving body 121 and the detecting electrode 111 provided on the oscillating plate 103. Opposing parts of the moving body side electrode 121a and the detecting electrode 111 can be considered as capacitors.

The position of the moving body 121 relative to the oscillating plate 103 can be detected by detecting the change in the electrostatic capacitance that is equivalent to a surface area of the opposing parts of the moving body side electrode 121a and the detecting electrode 111.

The first embodiment is configured such that, as the moving body 121 moves from the one movement limit position to the other movement limit position, the electrostatic capacitance between the moving body 121 and the detecting electrode 111 decreases.

A position defined by either of the projecting sections 105 and 106 can be set as the one movement limit position. Furthermore, as long as the electrostatic capacitance changes with the change in the position of the moving body, the position of the moving body and the electrostatic capacitances need not have a proportional relationship.

In the above-described structure, by applying a driving voltage to the piezoelectric element 102, the oscillating plate 103 is displaced in the direction of displacement of the piezoelectric element 102. The displacement of the oscillating plate 103 enables the moving body 121 disposed on the oscillating plate 103 to move by inertia in the movement range between the movement limit positions defined by the projecting sections 105 and 106. Moreover, the position of the moving body 121 relative to the oscillating plate 103 can be detected by detecting the change in the electrostatic capacitance equivalent to the surface area of the opposing parts of the moving body side electrode 121a and the detecting electrode 111.

A driving principle of the inertial drive actuator 100 is explained more specifically by taking an exemplary case in which the moving body 121 moves toward the right (toward the projecting section 106).

When a steeply rising voltage is applied to the piezoelectric element 102 by the driving unit 133, the piezoelectric element 102 rapidly expands and is displaced toward the left (toward the spring 104). With the displacement of the piezoelectric element 102 toward the left, the oscillating plate 103 is also rapidly displaced towards the left.

If a voltage of the detecting electrode 111, which is formed on the oscillating plate 103, and a voltage of the moving body side electrode 121a of the moving body 121 are maintained at the same potential, no electrostatic attraction is produced between the detecting electrode 111 and the moving body side electrode 121a. Consequently, the moving body 121 remains stationary at its current position due to its inertia.

Subsequently, when there is a steep fall in the voltage applied to the piezoelectric element 102, the piezoelectric element 102 rapidly contracts. In this case, because of the elastic force of the spring 104 that presses against the piezoelectric element 102 and the oscillating plate 103, the piezoelectric element 102 is rapidly displaced toward the right. With the displacement of the piezoelectric element 102 toward the right, the oscillating plate 103 is also rapidly displaced toward the right.

If an electrostatic attraction is produced by creating a potential difference between the detecting electrode 111 of the oscillating plate 103 and the moving body side electrode 121a of the moving body 121, frictional forces between the moving body side electrode 121*a* of the moving body 121 and the detecting electrode 111 increase. Accordingly, the moving body 121 is also displaced toward the right with the displacement of the oscillating plate 103 toward the right.

In other words, the detecting electrode 111 of the oscillating plate 103 and the moving body side electrode 121*a* of the moving body 121 also function as driving electrodes that control the frictional forces between the moving body 121 and the oscillating plate 103. Thus, the moving body 121 can be moved further toward the right in relation to the oscillating plate 103 by repeating the above-explained operation.

A calibration method for the inertial drive actuator 100 is explained next with reference to FIGS. 3 to 5.

In the following explanation, a case is presented in which the optimum first signal is calculated by driving the moving body 121 to the one movement limit position. The optimum first signal can be likewise calculated by driving the moving body 121 to the other movement limit position.

Figure 3:
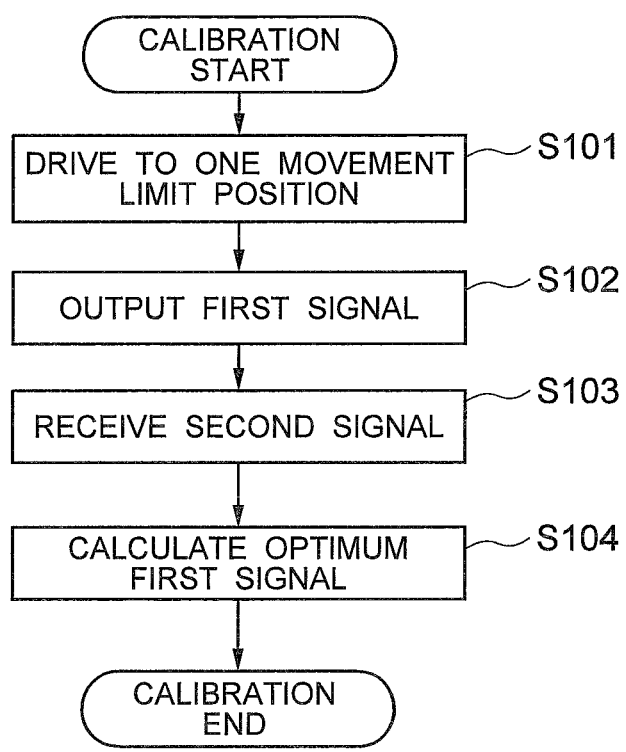
FIG. 3 is a flowchart of a calibration method for the inertial drive actuator according to the first embodiment of the present invention.

FIG. 3 is a flowchart of the calibration method for the inertial drive actuator 100. In the calibration method shown in FIG. 3, the driving unit 133 outputs a sufficient number of driving pulses required for moving the moving body 121 toward the one movement limit position. Due to the driving pulses, the moving body 121 moves to the side of the spring 104 where the electrostatic capacitance between the moving body side electrode 121*a* and the detecting electrode 111 is large, and abuts against the projecting section 105 (Step S101, driving step).

The output unit 142 outputs to the moving body side electrode 121*a* the first signal that causes detection of the electrostatic capacitance between the moving body side electrode 121*a* and the detecting electrode 111 (Step S102, output step). The first signal can have any waveform; however, a sine waveform is preferable. The first signal can either be output to the moving body side electrode 121*a* or to the detecting electrode 111; however, the first signal should preferably be output to the moving body side electrode 121*a*.

The first signal output by the output unit 142 passes through the capacitor formed between the moving body side electrode 121*a* and the detecting electrode 111, and it is received as the second signal by the receiving unit 143 (Step S103, receiving step). The second signal received by the receiving unit 143 is a voltage or a current.

Subsequently, based on the second signal received at the receiving step (Step S103) by the receiving unit 143, the calculating unit 141 calculates (computes) the optimum first signal (Step S104, calculating step). The calculated optimum first signal is stored in a memory unit of the calculating unit 141. At the calculating step, in addition, the calculating unit 141 calculates the optimum second signal corresponding to the optimum first signal, and stores the same in the memory unit. The optimum second signal is a signal that is anticipated to be obtained after the optimum first signal has passed through the capacitor formed between the moving body side electrode 121*a* and the detecting electrode 111.

A potential difference is created between the first signal output by the output unit 142 and the second signal received by the receiving unit 143. An impedance of the capacitor formed in the portion between the moving body side electrode 121*a* and the detecting electrode 111 through which the signal passes can be measured, and the current electrostatic capacitance can be determined.

The electrostatic capacitance can be calculated based on the output voltage and the current value of the first signal instead of the potential difference.

The optimum first signal can be calculated based on the electrostatic capacitance measured in this manner. The optimum first signal is a signal output from the output unit 142, and it is the signal that is received by the receiving unit 143 after the optimum first signal has passed through the moving body side electrode 121*a* and the detecting electrode 111 and that has a voltage that is close to the maximum voltage that can be received by the A/D converter.

Figure 4:
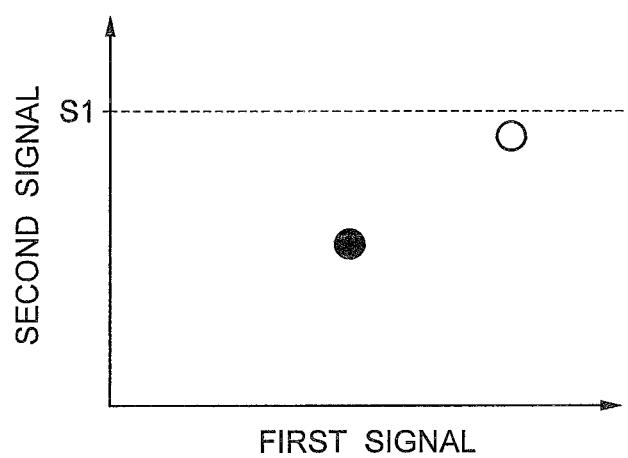
FIG. 4 is a graph depicting a relationship between a first signal, a second signal, a maximum allowable value that can be received by an A/D converter, and an optimum first signal according to the first embodiment of the present invention.

FIG. 4 is a graph depicting a relationship between the first signal, the second signal, a maximum allowable value that can be received by the A/D converter, and the optimum first signal.

In the example shown in FIG. 4, the calculating unit 141 calculates a combination of the optimum first signal and the optimum second signal (white circle) which is closer to the maximum voltage value (broken line) that can be received by the A/D converter than the measured first signal and second signal, represented by a black circle.

The optimum first signal can be calculated by any of the following methods: by changing the output voltage of the output unit 142, by changing a frequency of the signal output from the output unit 142, and by changing both.

After the optimum first signal is calculated, it should preferably be confirmed whether it is optimal. A calibration method that includes confirmation of the optimum first signal is explained below with reference to FIG. 5. FIG. 5 is a flowchart of the calibration method that includes a confirmation step.

Figure 5:
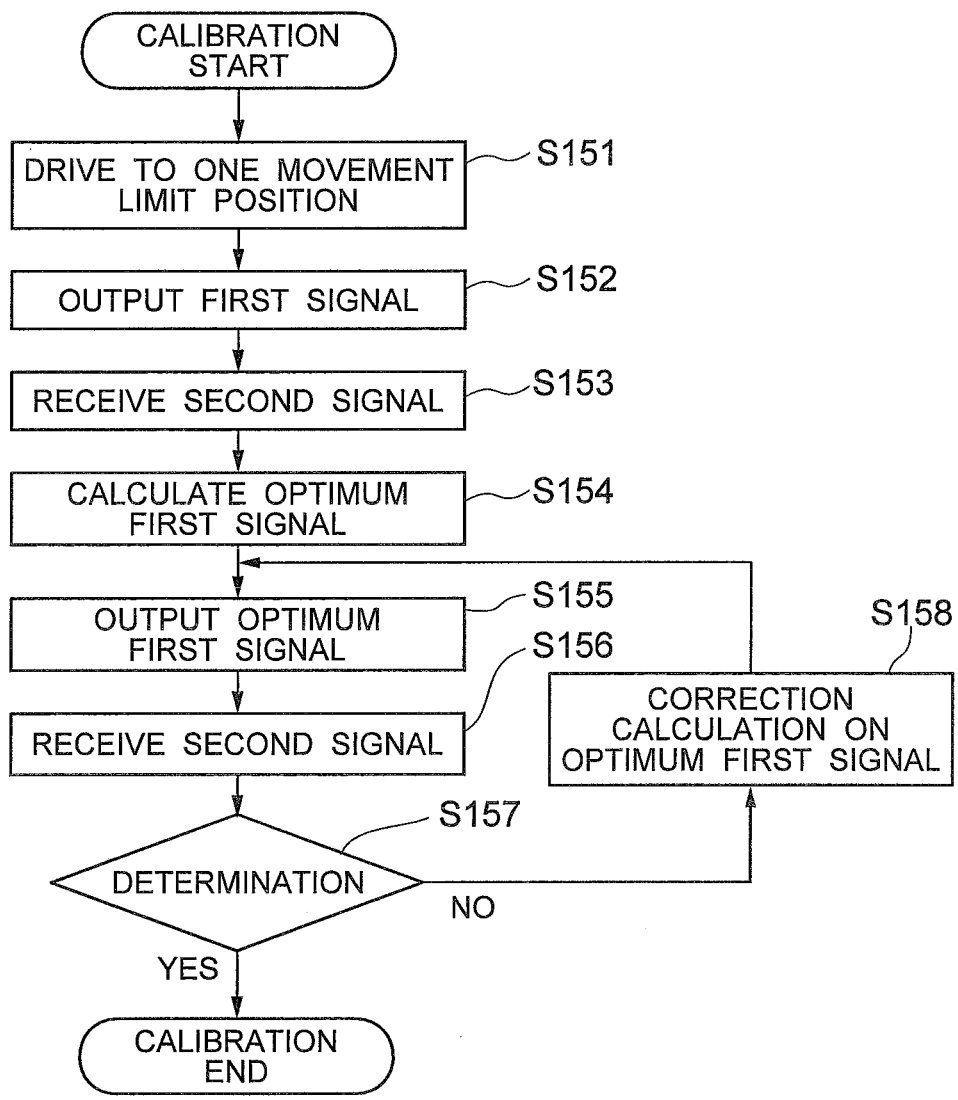
FIG. 5 is a flowchart of a calibration method according to the first embodiment of the present invention that includes a confirmation step.

The calibration method shown in FIG. 5 is the calibration method shown in FIG. 3 with a further addition of the confirmation steps, represented by Steps S155 to S157, and a correction calculation step, represented by Step S158. Accordingly, Steps S151 to S154 of FIG. 5 correspond to Steps S101 to S104, respectively, of FIG. 3, and hence the explanation thereof is omitted.

The optimum first signal calculated at the calculating step (Step S154) is output from the output unit 142 to the moving body side electrode 121*a* (Step S155). The optimum first signal output from the output unit 142 passes through the capacitor formed between the moving body side electrode 121*a* and the detecting electrode 111, and it is received as the second signal by the receiving unit 143 (Step S156). The received second signal is converted to a digital signal by the A/D converter within the receiving unit 143, and the digital second signal is output to the calculating unit 141.

Upon receiving the second digital signal from the receiving unit 143, the calculating unit 141 determines whether the optimum first signal is correct, based on the digital second signal (Step S157, determination step). At the determination step, a determination is made as to whether the optimum second signal and the digital second signal received by the receiving unit 143 by the output of the optimum first signal are equal. At the determination step, in addition, a further determination is made as to whether the digital second signal received as a target of determination by the receiving unit 143 and input into the A/D converter, has exceeded an allowable range for conversion by the A/D converter.

If the received digital second signal is equal to the optimum second signal and is within the allowable range for conversion by the A/D converter, the optimum first signal is determined to be optimal, and the calibration is ended.

On the other hand, if the received digital second signal is not equal to the optimum second signal, the calculating unit 141 performs the correction calculation on the optimum first signal so that the second signal becomes equal to the optimum second signal (Step S158, correction calculation step). Furthermore, if the received digital second signal exceeds the allowable range for conversion by the A/D converter, the calculating unit 141 performs the correction calculation on the optimum first signal so that the second signal is within the allowable range for conversion by the A/D converter.

Subsequently, the optimum first signal corrected at the correction calculation step is once again passed through confirmation steps (Steps S155 to S157) for confirmation whether the optimum first signal is optimal.

In other words, determination (at Step S157) is made based on the digital second signal obtained (at Step S156) from the corrected optimum first signal that is output to the moving body side electrode 121a (Step S155) and made to pass through the capacitor formed between the moving body side electrode 121a and the detecting electrode 111. Determination is performed in the same way as the confirmation step before the correction of the optimum first signal is performed. If the optimum first signal is optimal, calibration is ended; otherwise, correction calculation (Step S158) is repeated until the optimum first signal becomes optimal.

At the correction calculation step (Step S158), the optimum first signal subjected to correction calculation and the optimum second signal should preferably be stored in the memory unit within the calculating unit 141, and the optimum first signal before correction and the initial first signal, and the optimum first signal after correction should preferably be different signals. That is, when the first signal (optimum first signal) is output to the moving body 121 twice or more from the same place, preferably different signals should be output.

The initial first signal that is output should preferably be within the allowable range for conversion by the A/D converter of the receiving unit 143. In other words, the output of the first signal should start with a signal that is within the allowable range for conversion by the A/D converter.

Second Embodiment

Figure 6:
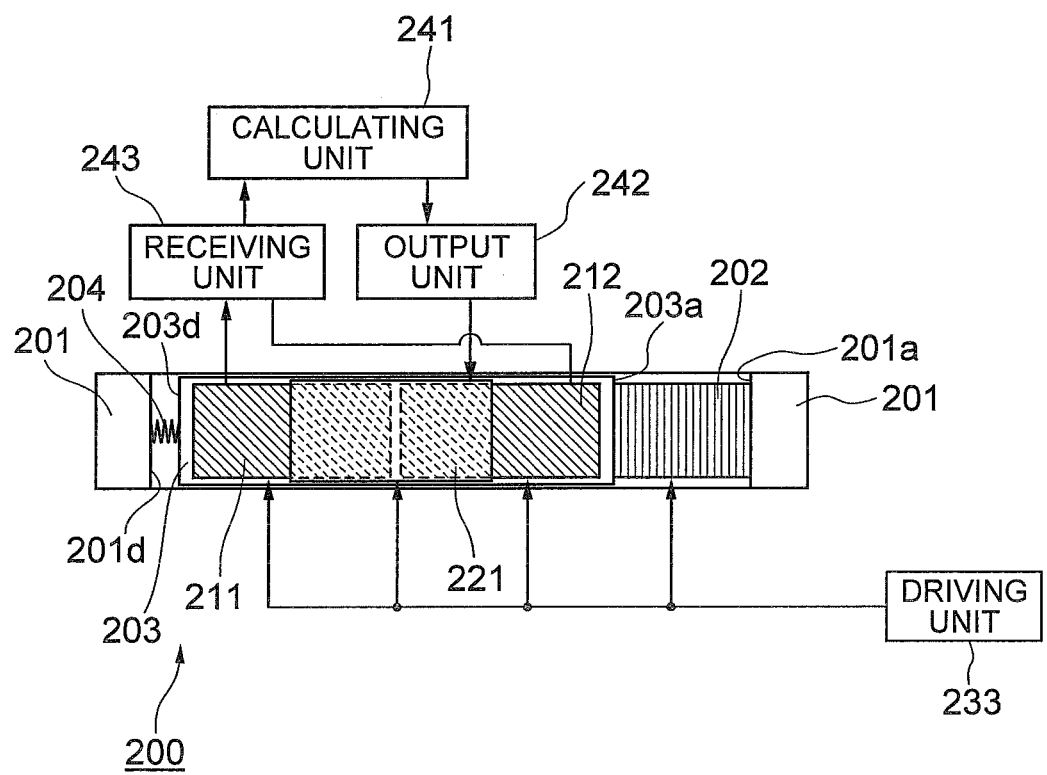
FIG. 6 is a plan view depicting a structure of an inertial drive actuator device according to a second embodiment of the present invention.
Figure 7:
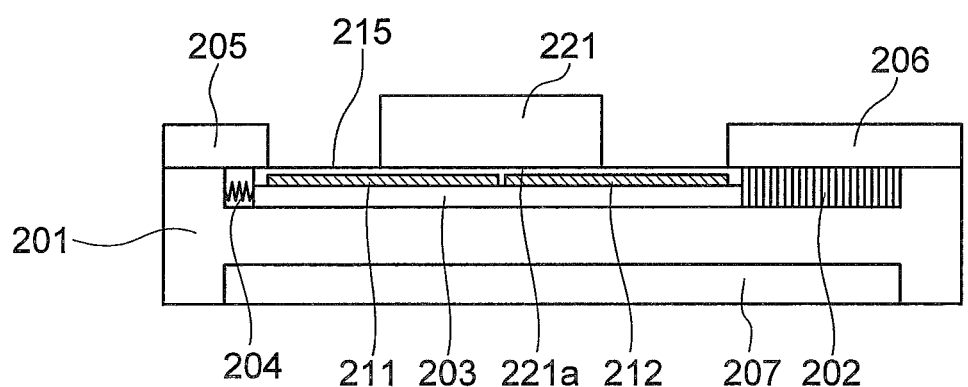
FIG. 7 is a side view depicting a structure of an inertial drive actuator according to the second embodiment of the present invention.

FIG. 6 is a plan view depicting a structure of the inertial drive actuator device according to a second embodiment of the present invention. FIG. 7 is a side view depicting a structure of an inertial drive actuator 200 of the inertial drive actuator device. Attention is drawn to the fact that projecting sections 205 and 206 that are shown in FIG. 7 are not shown in FIG. 6.

The inertial drive actuator device according to the second embodiment (FIGS. 6 and 7) differs from the inertial drive actuator device according to the first embodiment in that it has two detecting electrodes 211 and 212. The rest of the structure of the inertial drive actuator device according to the second embodiment is substantially identical to that of the inertial drive actuator device according to the first embodiment.

The inertial drive actuator device according to the second embodiment includes the inertial drive actuator 200, and a driving unit 233, a calculating unit 241, an output unit 242, and a receiving unit 243 that are connected to the inertial drive actuator 200. A fixed member 201 (inner surfaces 201a and 201d), a piezoelectric element 202, an oscillating plate 203 (side surfaces 203a and 203d), a spring 204, a permanent magnet 207, a moving body 221, a moving body side electrode 221a, the driving unit 233, the calculating unit 241, the output unit 242, and the receiving unit 243 according to the second embodiment, respectively, correspond to the fixed member 101 (inner surfaces 101a and 101d), the piezoelectric element 102, the oscillating plate 103 (side surfaces 103a and 103d), the spring 104, the permanent magnet 107, the moving body 121, the moving body side electrode 121a, the driving unit 133, the calculating unit 141, the output unit 142, and the receiving unit 143 according to the first embodiment, and hence the explanation thereof is omitted.

The detecting electrodes 211 and 212 are formed on an upper surface of the oscillating plate 203. Moreover, an insulation layer 215 is formed on an upper surface of the detecting electrodes 211 and 212. The moving body 221 is mounted on the detecting electrodes 211 and 212 with the insulation layer 215 disposed therebetween. By this structure, the moving body side electrode 221a faces the detecting electrodes 211 and 212.

The driving unit 233 is connected to each of the piezoelectric element 202, the detecting electrodes 211 and 212, and the moving body side electrode 221a of the moving body 221. The driving unit 233 applies a driving voltage to drive each of the piezoelectric element 202, the detecting electrodes 211 and 212, and the moving body side electrode 221a of the moving body 221.

In the inertial drive actuator device according to the second embodiment, the position of the moving body 221 relative to the oscillating plate 203 can be detected by comparing, or detecting, the difference between the electrostatic capacitance that is equivalent to a surface area of the opposing parts of the moving body side electrode 221a and the detecting electrode 211, and comparing, or detecting, the difference between the electrostatic capacitance equivalent to a surface area of the opposing parts of the moving body side electrode 221a and the detecting electrode 212.

For example, when the moving body 221 is moved toward the right on the paper surface in FIG. 6 or 7, the surface area of the opposing parts of the moving body side electrode 221a and the detecting electrode 212 increases, and hence the electrostatic capacitance between the detecting electrode 212 and the moving body side electrode 221a increases. On the other hand, the surface area of the opposing parts of the moving body side electrode 221a and the detecting electrode 211 gradually decreases, and hence the electrostatic capacitance between the detecting electrode 211 and the moving body side electrode 221a decreases. By determining the difference between the electrostatic capacitances, the position of the moving body 221 can be determined with a high degree of precision based on a magnitude relationship of the electrostatic capacitances.

The inertial drive actuator device according to the second embodiment can be configured such that, as the moving body 221 moves from one movement limit position (a position where the moving body 221 abuts against the projecting section 205) to the other movement limit position (a position where the moving body 221 abuts against the projecting section 206), the electrostatic capacitance between the electrodes of the moving body 221 and the oscillating plate 203 changes. Furthermore, the position of the moving body and the electrostatic capacitances should preferably have a proportional relationship in the movement range from the one movement limit position to the other movement limit position.

A position defined by either of the projecting sections 205 and 206 can be set as the one movement limit position. Moreover, the position of the moving body and the electrostatic capacitances need not have a proportional relationship as far as the electrostatic capacitance varies as the position of the moving body shifts.

In the above-described structure, a driving voltage is applied to the piezoelectric element 202 to displace the oscillating plate 203 in the direction of displacement of the piezoelectric element 202. The displacement of the oscillating plate 203 enables the moving body 221 disposed on the oscillating plate 203 to move by inertia in the movement range of the movement limit positions defined by the projecting sections 205 and 206. By detecting a static capacitance, which is equivalent to an area of portions of the moving body side electrode 221*a* and the detecting electrodes 211 and 212, it is possible to detect the position of the moving body 121 relative to the oscillating plate 203.

A driving principle of the inertial drive actuator 200 is explained more specifically by taking an exemplary case in which the moving body 221 moves toward the right (toward the projecting section 206).

When a steeply rising voltage is applied to the piezoelectric element 202 by the driving unit 233, the piezoelectric element 202 rapidly expands and is displaced toward the left (toward the spring 204). With the displacement of the piezoelectric element 202 toward the left, the oscillating plate 203 too is rapidly displaced toward the left.

If the voltages of the detecting electrodes 211 and 212, which are formed on the oscillating plate 203, and the voltage of the moving body side electrode 221*a* of the moving body 221 are maintained at the same potential, no electrostatic attraction is produced between the detecting electrodes 211 and 212, and the moving body side electrode 221*a*. Consequently, the moving body 221 remains stationary at its current position due to its inertia.

Subsequently, when there is a steep fall in the voltage applied to the piezoelectric element 202, the piezoelectric element 202 rapidly contracts. In this case, because of the elastic restoring force of the spring 204 that presses against the piezoelectric element 202 and the oscillating plate 203, the piezoelectric element 202 is rapidly displaced toward the right. With the displacement of the piezoelectric element 202 toward the right, the oscillating plate 203 too is rapidly displaced toward the right. If electrostatic attraction is produced by creating a potential difference between the detecting electrodes 211 and 212 of the oscillating plate 203, and the moving body side electrode 221*a* of the moving body 221, frictional forces between the moving body side electrode 221*a* and the detecting electrodes 211 and 212 increase. Accordingly, the moving body 221 is also displaced toward the right with the displacement of the oscillating plate 203 toward the right.

The moving body 221 can be moved further toward the right in relation to the oscillating plate 203 by repeating the above-explained operation.

Figure 8:
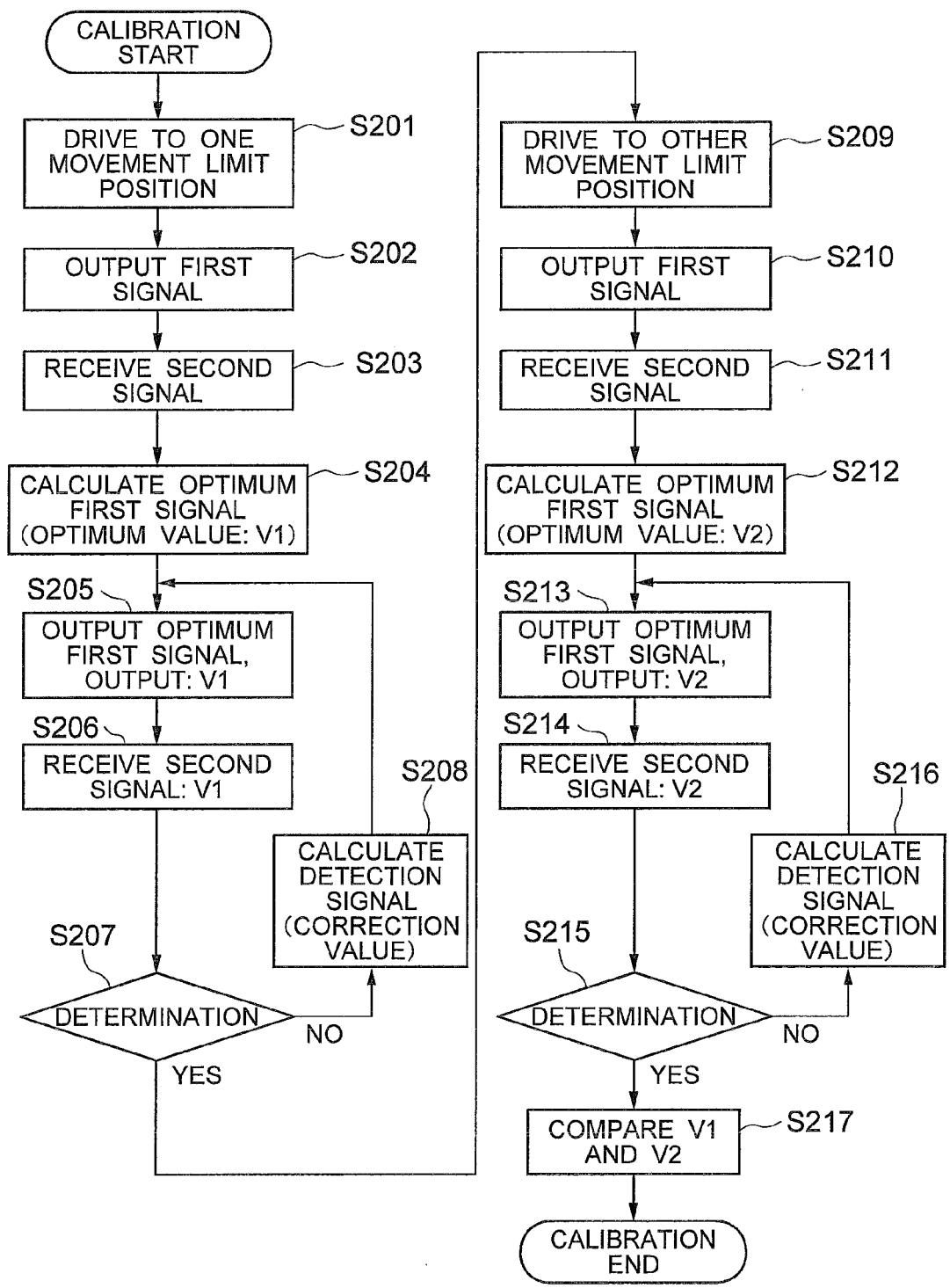
FIG. 8 is a flowchart of a calibration method for the inertial drive actuator according to the second embodiment of the present invention.

A calibration method for the inertial drive actuator 200 is explained next with reference to FIG. 8. FIG. 8 is a flowchart of the calibration method for the inertial drive actuator 200.

In the inertial drive actuator device according to the second embodiment, because position control is performed using two detecting electrodes 211 and 212, an optimum first signal at the one movement limit position is likely to differ from the optimum first signal at the other movement limit position. In consideration of this possibility, an optimum first signal V1 produced based on an electrostatic capacitance between the moving body 221 and the detecting electrode 211, and an optimum first signal V2 produced based on an electrostatic capacitance between the moving body 221 and the detecting electrode 212 are compared, and any one of them is selected as the optimum first signal. In other words, the calibration method for the inertial drive actuator 200 according to the second embodiment includes a comparison step (Step S217 in FIG. 8) at which the optimum first signals at the two movement limit positions are compared, should they differ, to determine which one is to be selected as the optimum first signal.

At the comparison step, comparison should preferably be made regardless of whether the optimum first signals at the two movement limit positions are identical. If the two optimum first signals differ, the first signal that is more optimal of the two first signals is selected, and if the two first signals are identical, one of them is selected.

Steps S201 to S208 of FIG. 8 correspond to Steps S151 to S158, respectively, of FIG. 5. After an optimum first signal V1 at the one movement limit position is calculated (Step S204), it is determined whether the optimum first signal V1 is optimal (Steps S205 to S207). If the optimum first signal V1 is not optimal, it is corrected (Step S208).

Furthermore, Steps S209 to S216 correspond to Steps S151 to S158, respectively, of FIG. 5. After an optimum first signal V2 at the other movement limit position is calculated (Step S212), it is determined whether the optimum first signal V2 is optimal (Steps S213 to S215). If the optimum first signal V2 is not optimal, it is corrected (Step S216).

In the calibration method according to the second embodiment, after Step S216, the optimum first signals V1 and V2 are compared to determine the optimum first signal (Step S217).

Figure 9A:
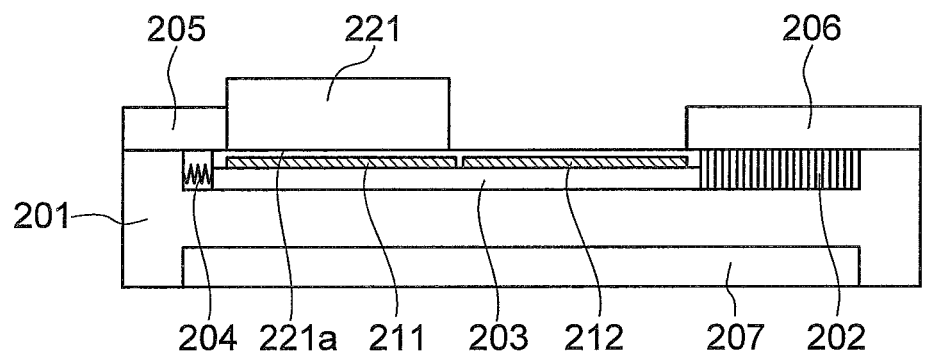
FIG. 9A is a side view depicting a structure of the inertial drive actuator when a moving body is at one movement limit position.
Figure 9B:
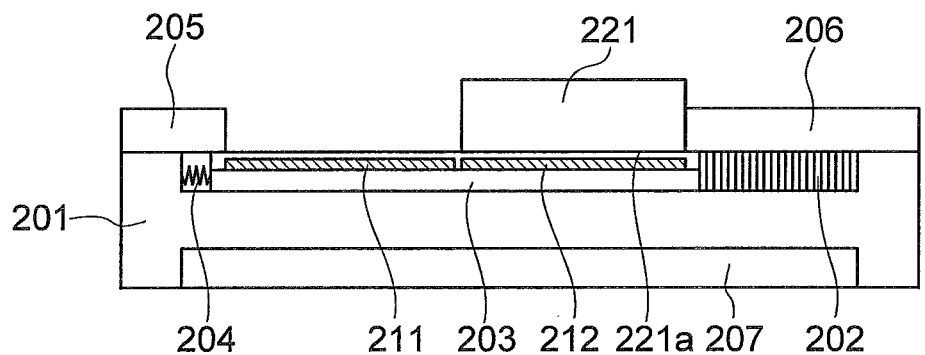
FIG. 9B is a side view depicting a structure of the inertial drive actuator when the moving body is at the other movement limit position.
Figure 10A:
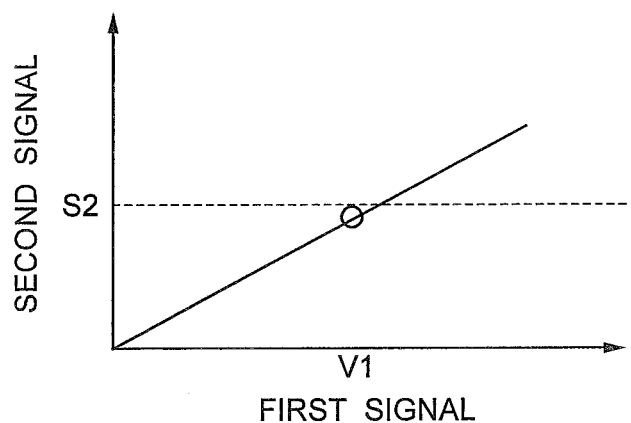
FIG. 10A is a graph depicting a relationship between the first signal, the second signal, the maximum allowable value that can be received by the A/D converter, and the optimum first signal when the moving body is at one movement limit position.
Figure 10B:
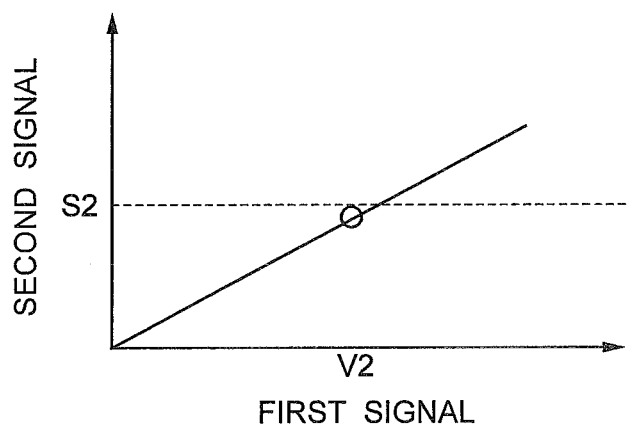
FIG. 10B is a graph depicting a relationship between the first signal, the second signal, the maximum allowable value that can be received by the A/D converter, and the optimum first signal when the moving body is at the other movement limit position.

The treatment of the optimum first signals at the two movement limit positions is explained with reference to FIGS. 9A, 9B, 10A, 10B, and 11. FIG. 9A is a side view depicting a structure of the inertial drive actuator 200 when the moving body 221 is at the one movement limit position. FIG. 9B is a side view depicting a structure of the inertial drive actuator 200 when the moving body 221 is at the other movement limit position. FIG. 10A is a graph depicting a relationship between the first signal, the second signal, the maximum allowable value that can be received by an A/D converter, and the optimum first signal when the moving body 221 is at the one movement limit position. FIG. 10B is a graph depicting a relationship between the first signal, the second signal, the maximum allowable value that can be received by the A/D converter, and the optimum first signal when the moving body 221 is at the other movement limit position. In FIGS. 10A and 10B, the broken line represents the maximum voltage value that can be received by the A/D converter, the white circle represents a combination of the optimum first signal and the optimum second signal, and the solid line represents a relationship between the first signal and the second signal.

An ideal state when an electrostatic capacitance between the moving body side electrode 221*a* and the detecting electrode 211 when the moving body 221 is at the one movement limit position (FIG. 9A) and an electrostatic capacitance between the moving body side electrode 221*a* and the detecting electrode 212 when the moving body 221 is at the other movement limit position (FIG. 9B) are equal is explained below. In FIGS. 10A and 10B that show this ideal state, the relationship between the first signal and the second signal at the one movement limit position and the relationship between the first signal and the second signal at the other movement limit position are identical to each other.

The optimum first signal can be selected by any of the following methods: by fixing a frequency and changing a voltage, by fixing the voltage and changing the frequency, and by changing both the voltage and the frequency. An example of selecting the optimum first signal by fixing the frequency and changing the voltage is presented here.

In the ideal state depicted in FIGS. 10A and 10B, the electrostatic capacitance at the one movement limit position and the electrostatic capacitance at the other movement limit position are equal to each other. Furthermore, the relationship between the first signal and the second signal at the one movement limit position and the relationship between the first signal and the second signal at the other movement limit position are identical to each other. Therefore, because the optimum first signal V1 at the one movement limit position and the optimum first signal V2 at the other movement limit position are identical, either of the optimum first signals can be selected.

The electrostatic capacitances at the two movement limit positions may differ from each other due to conditions such as manufacturing precision of various parts and setting of a control range of the moving body 221.

Figure 11:
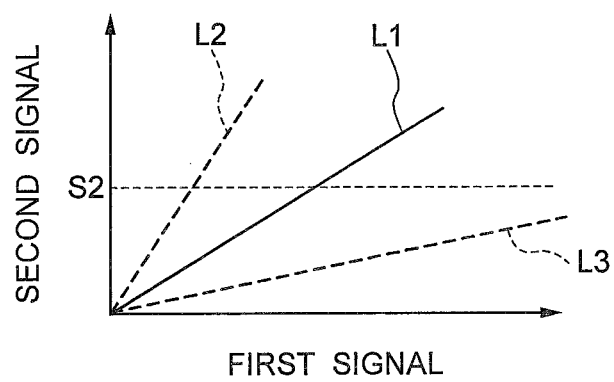
FIG. 11 is a graph depicting a relationship between the first signal, the second signal, the maximum allowable value that can be received by the A/D converter, and the optimum first signal according to the second embodiment of the present invention.

FIG. 11 is a graph depicting a relationship between the first signal, the second signal, the maximum allowable value that can be received by the A/D converter, and the optimum first signal. In FIG. 11, a solid line L1 represents the relationship between the first signal and the second signal under design conditions, a broken line L2 represents the relationship between the first signal and the second signal when the electrostatic capacitance calculated based on the second signal is smaller than in the case represented by the solid line L1, and a broken line L3 represents the relationship between the first signal and the second signal when the electrostatic capacitance calculated based on the second signal is larger than in the case represented by the solid line L1.

In FIG. 11, the broken line of a second signal S2 represents the maximum allowable value that can be received by the A/D converter.

When the electrostatic capacitances at the two movement limit positions are different from each other, the relationship between the first signal and the second signal at the one movement limit position and the relationship between the first signal and the second signal at the other movement limit position differ from each other. For example, if the relationship between the first signal and the second signal at the one movement limit position is represented by any one of the solid line L1, and the broken lines L2 and L3 shown in FIG. 11, then the relationship between the first signal and the second signal at the other movement limit position is represented by any of the other remaining lines.

In this case, because the optimum first signal V1 at the one movement limit position and the optimum first signal V2 at the other movement limit position differ from each other, it becomes necessary to compare the two optimum first signals V1 and V2 and select one of them as the optimum first signal (optimum voltage).

Selection of the optimum first signal when the optimum first signal V1 and the optimum second signal V2 differ from each other is explained below.

Figure 12A:
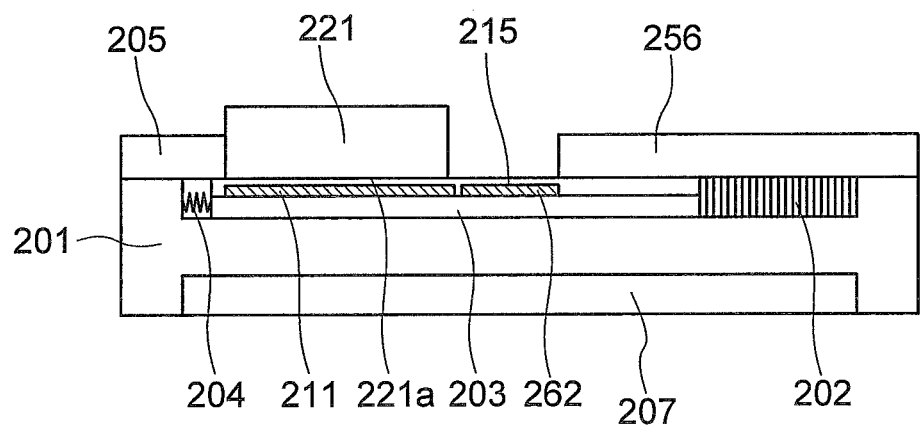
FIG. 12A is a side view depicting a structure of an inertial drive actuator presented as a comparative example, when the moving body is at one movement limit position.
Figure 12B:
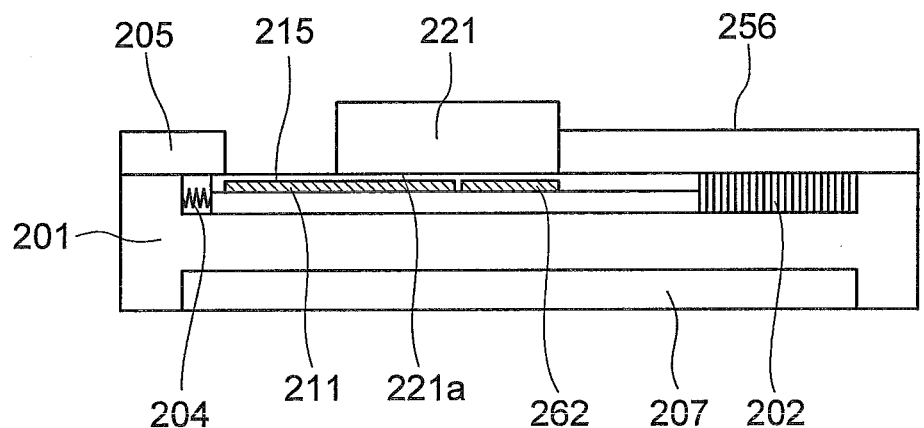
FIG. 12B is a side view depicting a structure of the inertial drive actuator presented as the comparative example, when the moving body is at the other movement limit position.
Figure 13A:
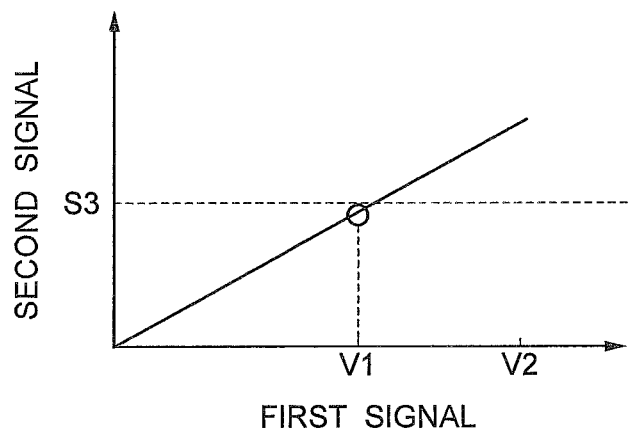
FIG. 13A is a graph depicting a relationship between the first signal, the second signal, the maximum allowable value that can be received by the A/D converter, and the optimum first signal when the moving body is at one movement limit position.
Figure 13B:
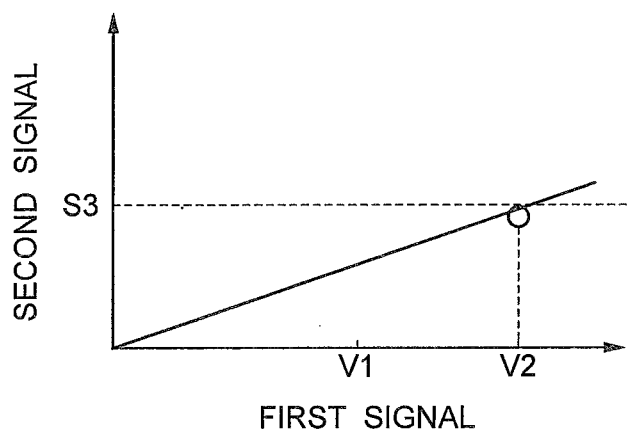
FIG. 13B is a graph depicting a relationship between the first signal, the second signal, the maximum allowable value that can be received by the A/D converter, and the optimum first signal when the moving body is at the other movement limit position.

FIGS. 12A and 12B are side views depicting a structure of an inertial drive actuator presented as a comparative example configured such that, an electrostatic capacitance C1 at the one movement limit position and an electrostatic capacitance C2 at the other movement limit position differ. FIG. 12A is a side view depicting the structure of the inertial drive actuator presented as the comparative example, when the moving body 221 is at the one movement limit position. FIG. 12B is a side view depicting the structure of the inertial drive actuator presented as the comparative example, when the moving body 221 is at the other movement limit position. FIG. 13A is a graph depicting a relationship between the first signal, the second signal, the maximum allowable value that can be received by the A/D converter, and the optimum first signal when the moving body 221 is at the one movement limit position. FIG. 13B is a graph depicting a relationship between the first signal, the second signal, the maximum allowable value that can be received by the A/D converter, and the optimum first signal when the moving body 221 is at the other movement limit position. In FIGS. 13A and 13B, the broken line represents the maximum voltage value corresponding to a second signal S3 that can be received by the A/D converter, the white circle represents a combination of the optimum first signal and the optimum second signal, and the solid line represents a relationship between the first signal and the second signal.

In the inertial drive actuator shown in FIGS. 12A and 12B, a length of a detecting electrode 262 on the side of the piezoelectric element 202, is kept shorter than a length of the detecting electrode 211 on the side of the spring 204 along the longitudinal direction of the oscillating plate 203, and corresponding to the shortness of the detecting electrode 262, a projecting section 256 on the side of the piezoelectric element 202 is extended up to the side of the spring 204. The detecting electrodes 211 and 262 are identical to each other in width and thickness. Due to this structure, the electrostatic capacitance C1 between the moving body side electrode 221a and the detecting electrode 211 at the one movement limit position where the moving body 221 abuts against the projecting section 205 is greater than the electrostatic capacitance C2 between the moving body side electrode 221a and the detecting electrode 262 at the other movement limit position where the moving body 221 abuts against the projecting section 256. The rest of the structure and operation of the inertial drive actuator presented as the comparative example are substantially identical to those of the inertial drive actuator 200, and hence the explanation thereof is omitted. Moreover, like reference symbols are assigned for like structural parts.

As shown in FIGS. 13A and 13B, in the inertial drive actuator presented as the comparative example, the relationship between the first signal and the second signal (solid line in FIG. 13A) at the one movement limit position and the relationship between the first signal and the second signal (solid line in FIG. 13B) at the other movement limit position differ from each other. Due to this, the optimum first signal V1 at the one movement limit position and the optimum first signal V2 at the other movement limit position differ from each other (V1<V2, see white circles in FIGS. 13A and 13B).

Supposing, between the optimum first signals V1 and V2, the optimum first signal V2 output at the other movement limit position is selected, it is evident that in the relationship between the first signal and the second signal at the one movement limit position (solid line in FIG. 13A), the second signal that corresponds to the optimum first signal V2, which is larger than the optimum first signal V1, is larger than the second signal S3. In other words, because the second signal exceeds the maximum allowable value that can be received by the A/D converter, it cannot be selected as the optimum signal.

On the other hand, if the optimum first signal V1 at the one movement limit position is selected, it can be discerned that the second signal corresponding to the other movement limit position does not exceed the second signal S3 that corresponds to the maximum allowable value that can be received by the A/D converter. Hence, the optimum first signal V1 at the one movement limit position can be selected as the optimum signal.

Thus, when the electrostatic capacitances at the two movement limit positions differ from each other, the optimum first signal determined from the relationship between the first signal and the second signal at the movement limit position where the electrostatic capacitance is larger is selected as the optimum signal.

The rest of the structure, operations, and effect of the inertial drive actuator presented as the comparative example are substantially identical to those of the first embodiment.

Third Embodiment

Figure 14:
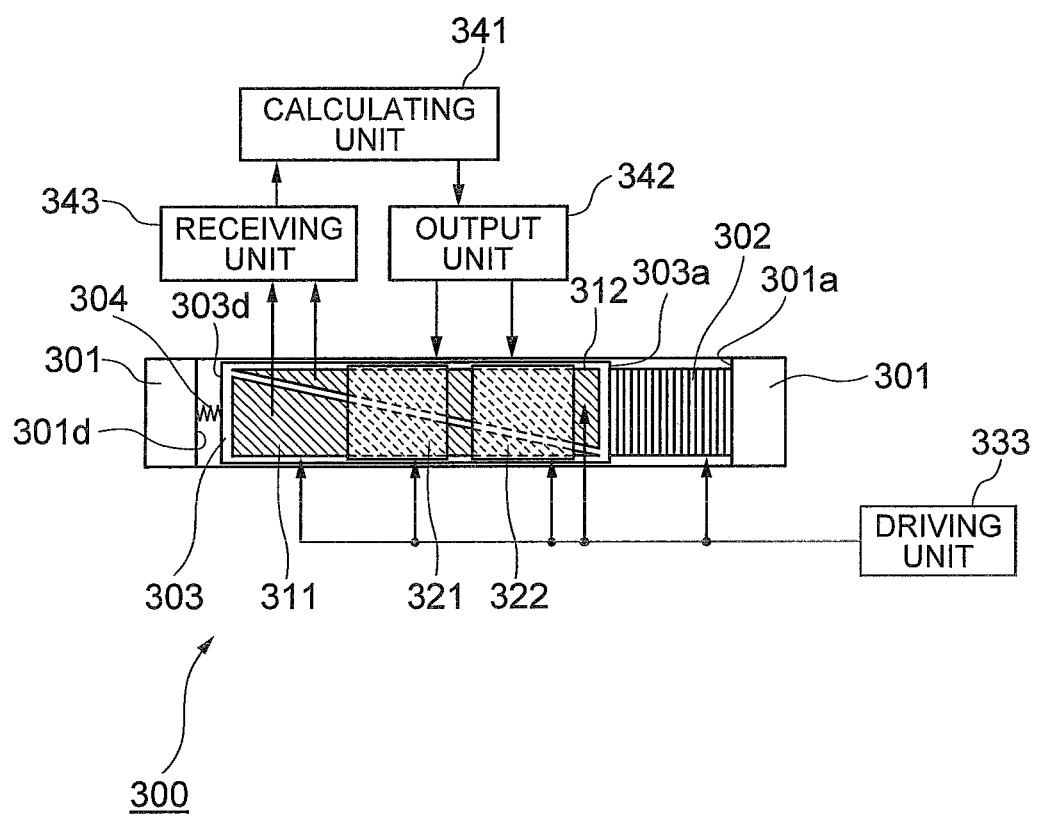
FIG. 14 is a plan view depicting a structure of an inertial drive actuator device according to a third embodiment of the present invention.
Figure 15:
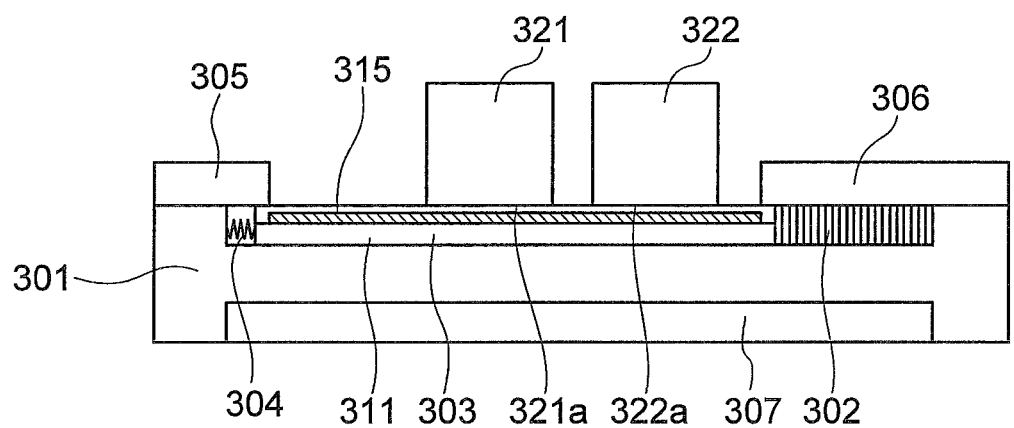
FIG. 15 is a side view depicting a structure of an inertial drive actuator according to the third embodiment of the present invention.
Figure 16:
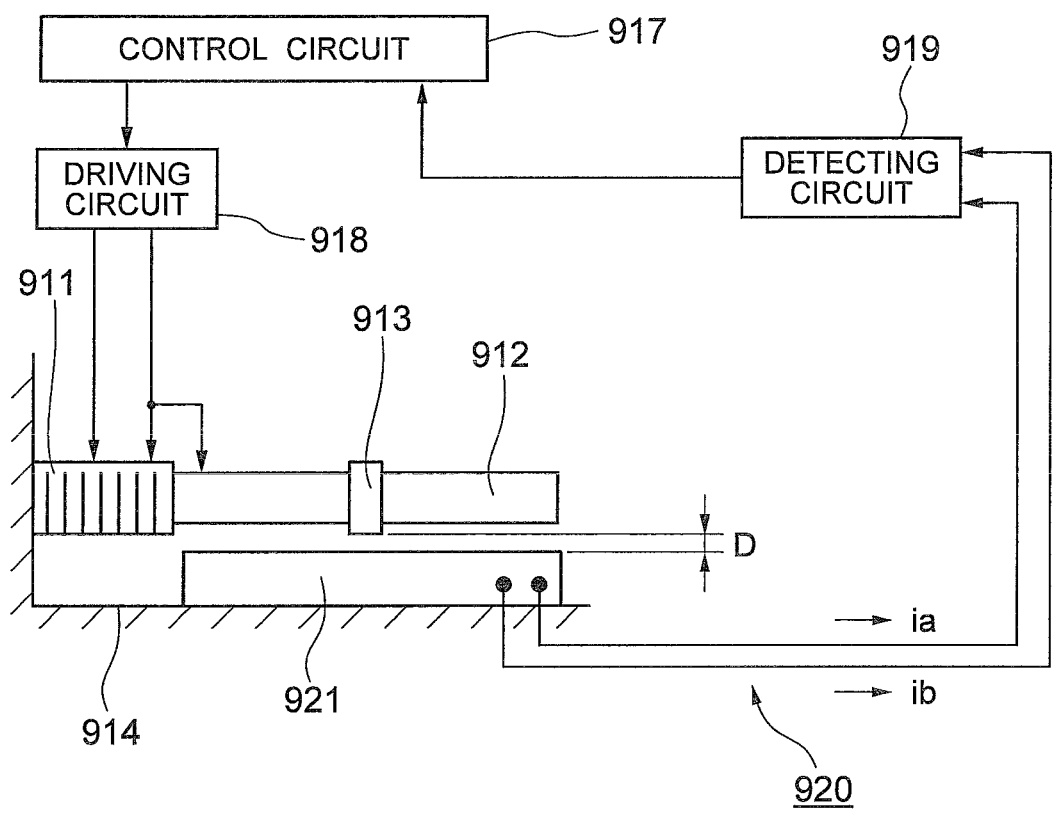
FIG. 16 is a side view depicting a structure of a conventional actuator.
Figure 17:
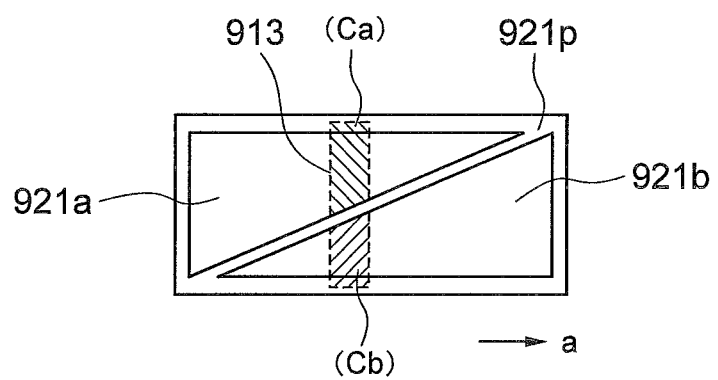
FIG. 17 is a plan view depicting a structure of a detecting member and a relationship between the detecting member and a moving body.

FIG. 14 is a plan view depicting a structure of an inertial drive actuator device according to a third embodiment of the present invention. FIG. 15 is a side view depicting a structure of an inertial drive actuator 300 of the inertial drive actuator device. Attention is drawn to the fact that projecting sections 305 and 306 that are shown in FIG. 7 are not shown in FIG. 14.

The inertial drive actuator device according to the third embodiment differs from the inertial drive actuator device according to the first embodiment in that it has two moving bodies 321 and 322, and two detecting electrodes 311 and 312. The rest of the structure of the inertial drive actuator device according to the third embodiment is substantially identical to that of the inertial drive actuator device according to the first embodiment.

The inertial drive actuator device according to the third embodiment includes the inertial drive actuator 300, and a driving unit 333, a calculating unit 341, an output unit 342, and a receiving unit 343 that are connected to the inertial drive actuator 300. A fixed member 301 (inner surfaces 301a and 301d), a piezoelectric element 302, an oscillating plate 303 (side surfaces 303a and 303d), a spring 304, a permanent magnet 307, the driving unit 333, the calculating unit 341, the output unit 342, and the receiving unit 343 according to the third embodiment, respectively, correspond to the fixed member 101 (inner surfaces 101a and 101d), the piezoelectric element 102, the oscillating plate 103 (side surfaces 103a and 103d), the spring 104, the permanent magnet 107, the driving unit 133, the calculating unit 141, the output unit 142, and the receiving unit 143 according to the first embodiment, and hence the explanation thereof is omitted.

The detecting electrodes 311 and 312 are formed on an upper surface of the oscillating plate 303. Moreover, an insulation layer 315 is formed on an upper surface of the detecting electrodes 311 and 312.

The detecting electrodes 311 and 312 have a planar shape of a right-angled triangle and are disposed in such a way that the oblique sides thereof are adjacent to each other. Specifically, a width of the detecting electrode 311 narrows as one goes from the spring 304 toward the piezoelectric element 302 in a longitudinal direction of the oscillating plate 303 (left and right directions in FIGS. 14 and 15), and a width of the detecting electrode 312 narrows as one goes from the piezoelectric element 302 toward the spring 304 in the longitudinal direction of the oscillating plate 303.

Because the detecting electrodes 311 and 312 have the planer shape described above, electrostatic capacitances between the detecting electrodes 311 and 312, and a moving body side electrode 321a of the moving body 321 should preferably vary proportionally with the movement amount as the moving body 321 moves from one movement limit position to the other movement limit position.

The moving bodies 321 and 322 are mounted on the detecting electrodes 311 and 312 with the insulation layer 315 disposed therebetween. The moving body side electrode 321a is formed on a lower surface of the moving body 321, and a moving body side electrode 322a is formed on a lower surface of the moving body 322, that is, the moving body side electrodes 321a and 322a are formed on surfaces that are in contact with the detecting electrodes 311 and 312, respectively.

With the displacement of the oscillating plate 303, the moving bodies 321 and 322 are capable of moving slidingly in relation to the insulation layer 315 in a longitudinal direction of the oscillating plate 303 having a rectangular shape.

The driving unit 333 is connected to each of the piezoelectric element 302, the detecting electrodes 311 and 312, and the moving body side electrodes 321a and 322a of the moving bodies 321 and 322. The driving unit 333 applies a driving voltage to drive each of the piezoelectric element 302, the detecting electrodes 311 and 312, and the moving body side electrodes 321a and 322a of the moving bodies 321 and 322.

In the inertial drive actuator device according to the third embodiment, positions of the moving bodies 321 and 322 relative to the oscillating plate 303 can be detected by comparing, or detecting, the difference between the electrostatic capacitances that are equivalent to surface areas of the opposing parts of the moving body side electrodes 321a and 322a and the detecting electrode 311, and comparing, or detecting, the difference between the electrostatic capacitances that are equivalent to the surface areas of the opposing parts of the moving body side electrodes 321a and 322a and the detecting electrode 312.

For example, when the moving bodies 321 and 322 are moved toward the right on the paper surface in FIG. 14 or 15, the surface area of the opposing parts of the moving body side electrodes 321a and 322a and the detecting electrode 312 increases, and hence the electrostatic capacitances between the detecting electrode 312 and the moving body side electrodes 321a and 322a increase. On the other hand, the surface area of the opposing parts the moving body side electrodes 321a and 322a and the detecting electrode 311 decreases, and hence the electrostatic capacitances between the detecting electrode 311 and the moving body side electrodes 321a and 322a decrease. By determining the difference between the electrostatic capacitances, the positions of the moving bodies 321 and 322 can be determined with a high degree of precision based on a magnitude relationship of the electrostatic capacitances.

The positions of the moving bodies 321 and 322 and the electrostatic capacitances should preferably have a proportional relationship in a movement range from the one movement limit position to the other movement limit position.

A position defined by either of the projecting sections 305 and 306, with either of the moving bodies 321 and 322 in contact with it, can be set as the one movement limit position. Furthermore, as long as the electrostatic capacitance changes with the change in the positions of the moving bodies, the positions of the moving bodies and the electrostatic capacitances need not have a proportional relationship.

In the above-described structure, when a driving voltage is applied to the detecting electrodes 311 and 312, and the piezoelectric element 302, the oscillating plate 303 is displaced in the direction of displacement of the piezoelectric element 302. The displacement of the oscillating plate 303 enables the moving bodies 321 and 322 disposed on the oscillating plate 303 to move by inertia in the movement range defined by the projecting sections 305 and 306. While explaining a driving principle and the calibration method in detail, detailed explanation of the structural parts that are identical to those in the inertial drive actuator 200 according to the second embodiment are omitted.

In the inertial drive actuator device according to the third embodiment, an optimum first signal each is calculated at one movement limit position and the other movement limit position for each of the moving bodies 321 and 322. Even though the optimum first signals of the moving bodies 321 and 322 are calculated separately, after calculation, they can be unified into any of the optimum first signals. Unification is performed in the same way as selection of the optimum first signal, as explained above (FIGS. 10A and 10B). That is, the optimum first signal of each of the moving bodies 321 and 322 at the movement limit position where the electrostatic capacitance increases to a point where the second signal does not exceed the maximum allowable value that can be received by the A/D converter is selected, and the selected optimum first signals of the two moving bodies 321 and 322 are unified.

The rest of the structure, operations, and effect according to the third embodiment are identical to those according to the first embodiment or the second embodiment.

Fourth Embodiment

An inertial drive actuator according to a fourth embodiment is explained below. The inertial drive actuator according to the fourth embodiment includes an oscillating member coupled to a fixed member in sequence after a piezoelectric element, a moving body friction-coupled to the oscillating member, and a detecting electrode provided on a fixed plate disposed substantially parallel to a coupling direction of the oscillating member and extended with a uniform gap maintained in relation to the coupling direction. The oscillating member is disposed substantially parallel to the detecting electrode. The moving body moves slidingly with the oscillating member while maintaining a distance from the detecting electrode.

A driving unit that applies a driving voltage is connected to the piezoelectric element. An output unit is connected to the moving body, and a receiving unit is connected to the detecting electrode. The output unit and the receiving unit are connected to a calculating unit.

The fixed member, the piezoelectric element, the oscillating member, the detecting electrode, the moving body, the calculating unit, the output unit, and the receiving unit according to the fourth embodiment correspond, respectively, to the fixed member 101, the piezoelectric element 102, the oscillating plate 103, the detecting electrode 111, the moving body 121, the calculating unit 141, the output unit 142, and the receiving unit 143 according to the first embodiment. A driving principle and a calibration method for the inertial drive actuator according to the fourth embodiment are substantially identical to those of the inertial drive actuator 100 according to the first embodiment, and hence the explanation thereof is omitted.

The rest of the structure, operations, and effect according to the fourth embodiment are identical to those according to the first embodiment.

Thus, the calibration method for the inertial drive actuator and the inertial drive actuator device according to the present invention are suitable for use in an inertial drive actuator device in which it is necessary to perform position detection with high precision.

A calibration method for an inertial drive actuator and an inertial drive actuator device according to the present invention can perform position detection with high precision regardless of an amount of an electrostatic capacitance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for calibrating an inertial drive actuator for detecting a moving body based on an electrostatic capacitance, the method comprising:
    driving the moving body;
    outputting a first signal for detecting the electrostatic capacitance of opposing parts of a moving body side electrode provided on the moving body and a detecting electrode provided opposing the moving body side electrode;
    receiving a second signal obtained after the first signal output has passed through the moving body side electrode and the detecting electrode; and
    calculating an optimum first signal for detecting the electrostatic capacitance of opposing parts of the moving body side electrode provided on the moving body and the detecting electrode provided opposing the moving body side electrode based on the second signal received.

2. The method for calibrating the inertial drive actuator according to claim 1, further comprising confirming, after the optimum first signal is calculated, whether the optimum first signal is optimal.

3. The method for calibrating the inertial drive actuator according to claim 2, wherein the confirming includes determining whether the second signal is equal to an optimum second signal corresponding to the optimum first signal.

4. The method for calibrating the inertial drive actuator according to claim 3, further comprising subjecting the optimum first signal calculated to a correction calculation if it is determined that the second signal is not equal to the optimum second signal.

5. The method for calibrating the inertial drive actuator according to claim 1, wherein the outputting includes outputting different signals when outputting the first signal to the moving body twice or more at one position.

6. The method for calibrating the inertial drive actuator according to claim 1, wherein
    the moving body is movable between a one movement limit position and another movement limit position, and
    the calculating includes calculating the optimum first signal at each of the one movement limit position and the other movement limit position.

7. The method for calibrating the inertial drive actuator according to claim 1, wherein a signal that is within an allowable range for A/D conversion is output as the first signal for detecting the electrostatic capacitance of opposing parts of the moving body side electrode provided on the moving body and the detecting electrode provided opposing the moving body side electrode.

8. The method for calibrating the inertial drive actuator according to claim 6, wherein the electrostatic capacitance is proportionally related to a distance from the one movement limit position to the other movement limit position.

9. The method for calibrating the inertial drive actuator according to claim 1, wherein when there is a plurality of the moving bodies, there is a separate optimum first signal for each moving body.

10. The method for calibrating the inertial drive actuator according to claim 1, wherein when there is a plurality of the moving bodies, the optimum first signals of the moving bodies are unified.

11. The method for calibrating the inertial drive actuator according to claim 6, further comprising comparing the optimum first signals to determine which one is optimal when the optimum first signals at the one movement limit position and the other movement limit position differ from each other.

12. An inertial drive actuator device comprising:
    a driving unit that drives a moving body;
    an output unit that outputs a first signal for detecting an electrostatic capacitance of opposing parts of a moving body side electrode provided on the moving body and a detecting electrode provided opposing the moving body side electrode;
    a receiving unit that receives a second signal obtained after the first signal output by the output unit has passed through the moving body side electrode and the detecting electrode; and
    a calculating unit that calculates an optimum first signal for detecting the electrostatic capacitance of opposing parts of the moving body side electrode provided on the moving body and the detecting electrode provided opposing the moving body side electrode based on the second signal received by the receiving unit.

13. The inertial drive actuator device according to claim 12, wherein the moving body moves by inertia in relation to an oscillating plate that is moved to reciprocate, and the detecting electrode is disposed between the moving body and the oscillating plate.

14. The inertial drive actuator device according to claim 13, wherein the detecting electrode also functions as a driving electrode that produces electrostatic attraction between itself and the moving body side electrode and controls frictional forces between the oscillating plate and the moving body.

15. The inertial drive actuator device according to claim 12, wherein a plurality of the detecting electrodes is provided.

16. The inertial drive actuator device according to claim 12, wherein a plurality of the moving bodies is provided.

17. The inertial drive actuator device according to claim 12, wherein the moving body is made of a conductive material.

18. The inertial drive actuator device according to claim 13, further comprising a permanent magnet disposed on a side of the oscillating plate opposite to the moving body, wherein the moving body includes a magnetic material.

* * * * *